(12) United States Patent
Jaiswal et al.

(10) Patent No.: US 10,949,787 B2
(45) Date of Patent: Mar. 16, 2021

(54) AUTOMATED PARTICIPATION EVALUATOR (71) Applicant: INTERNATIONAL BUSINESS MACHINES CORPORATION, Armonk, NY (US)

(72) Inventors: Peeyush Jaiswal, Boca Raton, FL (US); Priyansh Jaiswal, Boca Raton, FL (US); David Jaramillo, Durham, NC (US); Paul Llamas Virgen, Ciudad Guzmán (ME); Annita Tomko, Zapopan Jalisco (ME)

(73) Assignee: International Business Machines Corporation, Armonk, NY (US)

( * ) Notice: Subject to any disclaimer, the term of this patent is extended or adjusted under 35 U.S.C. 154(b) by 245 days.

(21) Appl. No.: 16/050,344

(22) Filed: Jul. 31, 2018

(65) Prior Publication Data

US 2020/0042916 A1 Feb. 6, 2020

(51) Int. Cl.
*G06Q 10/06* (2012.01)
*G10L 15/183* (2013.01)
(Continued)

(52) U.S. Cl.
CPC ......... *G06Q 10/0639* (2013.01); *G06F 40/40* (2020.01); *G06Q 10/109* (2013.01); *G10L 15/183* (2013.01); *G06Q 10/06398* (2013.01)

(58) Field of Classification Search
CPC ......... G06Q 10/0639; G06Q 10/06398; G06Q 10/109; G06F 40/40; G10L 15/183
(Continued)

(56) References Cited

U.S. PATENT DOCUMENTS 5,991,376 A 11/1999 Hennessy et al.
7,321,883 B1 1/2008 Freedy et al.
(Continued)

OTHER PUBLICATIONS

Empathic tutoring software agents using real-time eye tracking. Wang, Hua et al. Proceedings of the 2006 symposium on Eye tracking research & applications. Mar. 2006. pp. 73-78.*
(Continued)

*Primary Examiner* — Timothy Padot
(74) *Attorney, Agent, or Firm* — Patrick J. Daugherty; Daugherty & Del Zoppo Co. LPA (57) ABSTRACT

Embodiments provide an automated participation evaluator, wherein processors are configured to evaluate participation of meeting attendees with respect to performance criteria including participation criteria and deliverable contribution criteria; populate object fields associated to ones of the performance criteria and attendees with values representing a quality of performance of the associated attendees relative to the associated performance criteria; notify the attendees of the populated object field values in response to determining that time for evaluating participation of the attendees with respect to performance criteria has not elapsed; update the populated object field values via reevaluating participation of the attendees in response to the notifying of the attendees of the populated values; and reward the attendees with reward values selected as a function of the updated, populated values, in response to determining time for evaluating the participation of the attendees with respect to each of the performance criteria has elapsed.

20 Claims, 5 Drawing Sheets

(51) Int. Cl.
*G06Q 10/10* (2012.01)
*G06F 40/40* (2020.01)

(58) Field of Classification Search
USPC ........................................................ 705/7.38
See application file for complete search history.

(56) References Cited

U.S. PATENT DOCUMENTS

| | | | |
|---|---|---|---|
| 8,904,296 | B2 | 12/2014 | Sahai et al. |
| 8,935,633 | B2* | 1/2015 | Bush .................. G06Q 10/1095 |
| | | | 715/810 |
| 9,262,747 | B2 | 2/2016 | Herger et al. |
| 9,363,093 | B2* | 6/2016 | Givental ............. H04L 12/1831 |
| 2002/0019765 | A1* | 2/2002 | Mann ............. G06Q 10/063112 |
| | | | 705/7.14 |
| 2006/0069619 | A1* | 3/2006 | Walker ............... G06Q 30/0236 |
| | | | 705/14.25 |
| 2006/0195354 | A1* | 8/2006 | Borovoy .......... G06Q 10/06398 |
| | | | 705/7.19 |
| 2006/0248007 | A1 | 11/2006 | Hofer et al. |
| 2007/0100939 | A1 | 5/2007 | Bagley et al. |
| 2009/0132345 | A1* | 5/2009 | Meyssami .............. G06Q 10/10 |
| | | | 705/7.33 |
| 2009/0172100 | A1 | 7/2009 | Callanan et al. |
| 2011/0035680 | A1 | 2/2011 | Borovoy et al. |
| 2013/0282421 | A1* | 10/2013 | Graff ....................... H04L 63/08 |
| | | | 705/7.18 |
| 2013/0339875 | A1 | 12/2013 | Sahai et al. |
| 2014/0160224 | A1 | 6/2014 | Herger et al. |
| 2015/0006221 | A1* | 1/2015 | Mermelstein ...... G06Q 10/1095 |
| | | | 705/7.19 |
| 2015/0154291 | A1 | 6/2015 | Shepherd et al. |
| 2015/0326458 | A1 | 11/2015 | Gottlieb |
| 2016/0073058 | A1* | 3/2016 | Bader-Natal ........ H04L 65/1093 |
| | | | 348/14.03 |
| 2016/0260044 | A1* | 9/2016 | Sabet ................ G06Q 10/06398 |
| 2016/0358065 | A1* | 12/2016 | Gedge ................. G06Q 10/1095 |
| 2017/0293356 | A1* | 10/2017 | Khaderi .................. G06F 3/147 |

OTHER PUBLICATIONS

Gaze-Based Detection of Mind Wandering during Lecture Viewing. Hutt, Stephen et al. International Educational Data Mining Society, Paper presented at the International Conference on Educational Data Mining (EDM) (10th, Wuhan, China, Jun. 25-28, 2017 ).*
Peter Mell et al, The NIST Definition of Cloud Computing, National Institute of Standards and Technology, Publication 800-145, 2011, entire document.
Fernando De La Torre et al, Omnidirectional Video Capturing, Multiple People Tracking and Identification for Meeting Monitoring, Robotics Institute, Carnegie Mellon University, 2005, entire document.

* cited by examiner

AUTOMATED PARTICIPATION EVALUATOR

BACKGROUND

Meetings of groups of people to discuss issues, impart training, etc., may occur with meeting attendees located within a common, physical space (meeting room, auditorium, arena, etc.), or they may occur "virtually." A virtual meeting generally refers to an activity wherein a group of people share a common virtual environment on a telephonic connection or on a local or wide-area network or the web to review and discuss topics in real-time conversational formats, wherein each attendee is present and takes part through a communication device link and may be physically located anywhere, rather than meeting in a common or designated physical location. Virtual events may be highly interactive, and provide cost and resource-effective alternatives to physical meeting counterparts.

Relative to conventional, physical meetings, virtual event structures enable service providers to greatly scale up attendance and participation in a given event. Limits on attendee number and participation imposed by the capacity of meeting rooms, or by the requirement that attendees must physically travel to a specific geographic meeting site at a designated date and time, are eliminated by disseminating meeting content to networked, personal audio-visual devices, which may be located anywhere in the world that has permission to access a networked dissemination point. Examples of virtual events include virtual meetings, tradeshows, job fairs and conferences. Virtual events may be used to deliver presentations, provide training materials and real-time demonstrations, and acquire real-time feedback from participants that may be used to responsively alter the content and format of the on-going meeting, wherein the scale of the meeting in terms of attendance and participation is limited only by bandwidth and presenter response capacity.

SUMMARY

In one aspect of the present invention, a computerized method for an automated participation evaluator includes executing steps on a computer processor. Thus, a computer processor is configured to evaluate participation of meeting attendees with respect to performance criteria including participation criteria and deliverable contribution criteria; populate object fields that are each associated to ones of the performance criteria and attendees with values representing a quality of performance of the associated attendees relative to the associated performance criteria; notify the attendees of the populated object field values in response to determining that a period of time for evaluating participation of the attendees with respect to performance criteria has not elapsed; update the populated object field values via reevaluating participation of the attendees in response to the notifying of the attendees of the populated values; and reward the attendees with reward values selected as a function of the updated, populated values, in response to determining that periods of time for evaluating the participation of the attendees with respect to each of the performance criteria has elapsed.

In another aspect, a system has a hardware processor in circuit communication with a computer readable memory and a computer-readable storage medium having program instructions stored thereon. The processor executes the program instructions stored on the computer-readable storage medium via the computer readable memory and is thereby configured to evaluate participation of meeting attendees with respect to performance criteria including participation criteria and deliverable contribution criteria; populate object fields that are each associated to ones of the performance criteria and attendees with values representing a quality of performance of the associated attendees relative to the associated performance criteria; notify the attendees of the populated object field values in response to determining that a period of time for evaluating participation of the attendees with respect to performance criteria has not elapsed; update the populated object field values via reevaluating participation of the attendees in response to the notifying of the attendees of the populated values; and reward the attendees with reward values selected as a function of the updated, populated values, in response to determining that periods of time for evaluating the participation of the attendees with respect to each of the performance criteria has elapsed.

In another aspect, a computer program product for an automated participation evaluator has a computer-readable storage medium with computer readable program code embodied therewith. The computer readable hardware medium is not a transitory signal per se. The computer readable program code includes instructions for execution which cause the processor to evaluate participation of meeting attendees with respect to performance criteria including participation criteria and deliverable contribution criteria; populate object fields that are each associated to ones of the performance criteria and attendees with values representing a quality of performance of the associated attendees relative to the associated performance criteria; notify the attendees of the populated object field values in response to determining that a period of time for evaluating participation of the attendees with respect to performance criteria has not elapsed; update the populated object field values via reevaluating participation of the attendees in response to the notifying of the attendees of the populated values; and reward the attendees with reward values selected as a function of the updated, populated values, in response to determining that periods of time for evaluating the participation of the attendees with respect to each of the performance criteria has elapsed.

BRIEF DESCRIPTION OF THE DRAWINGS

These and other features of embodiments of the present invention will be more readily understood from the following detailed description of the various aspects of the invention taken in conjunction with the accompanying drawings in which.

DETAILED DESCRIPTION

The present invention may be a system, a method, and/or a computer program product at any possible technical detail level of integration. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and be rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1:
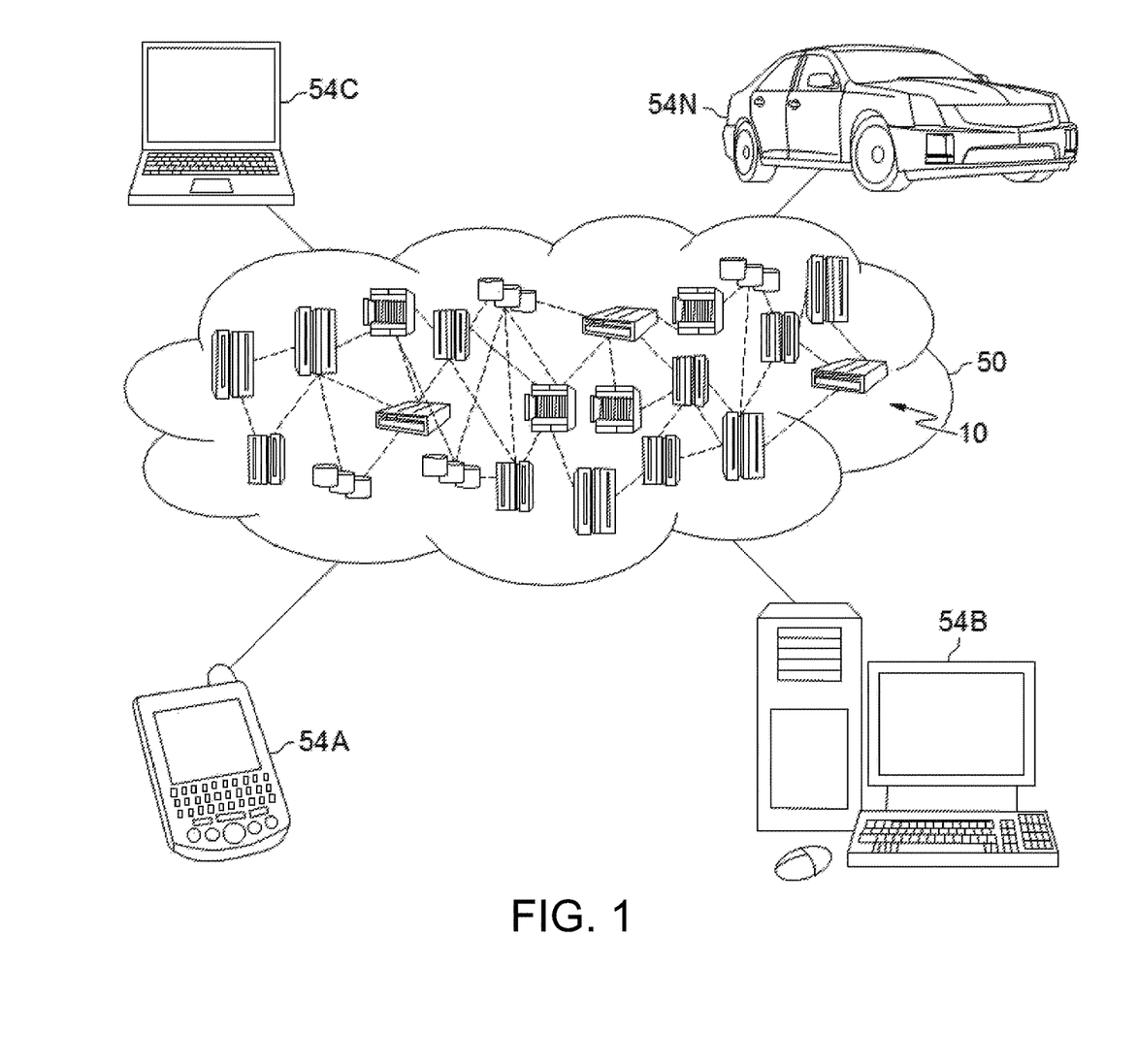
FIG. 1 depicts a cloud computing environment according to an embodiment of the present invention.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
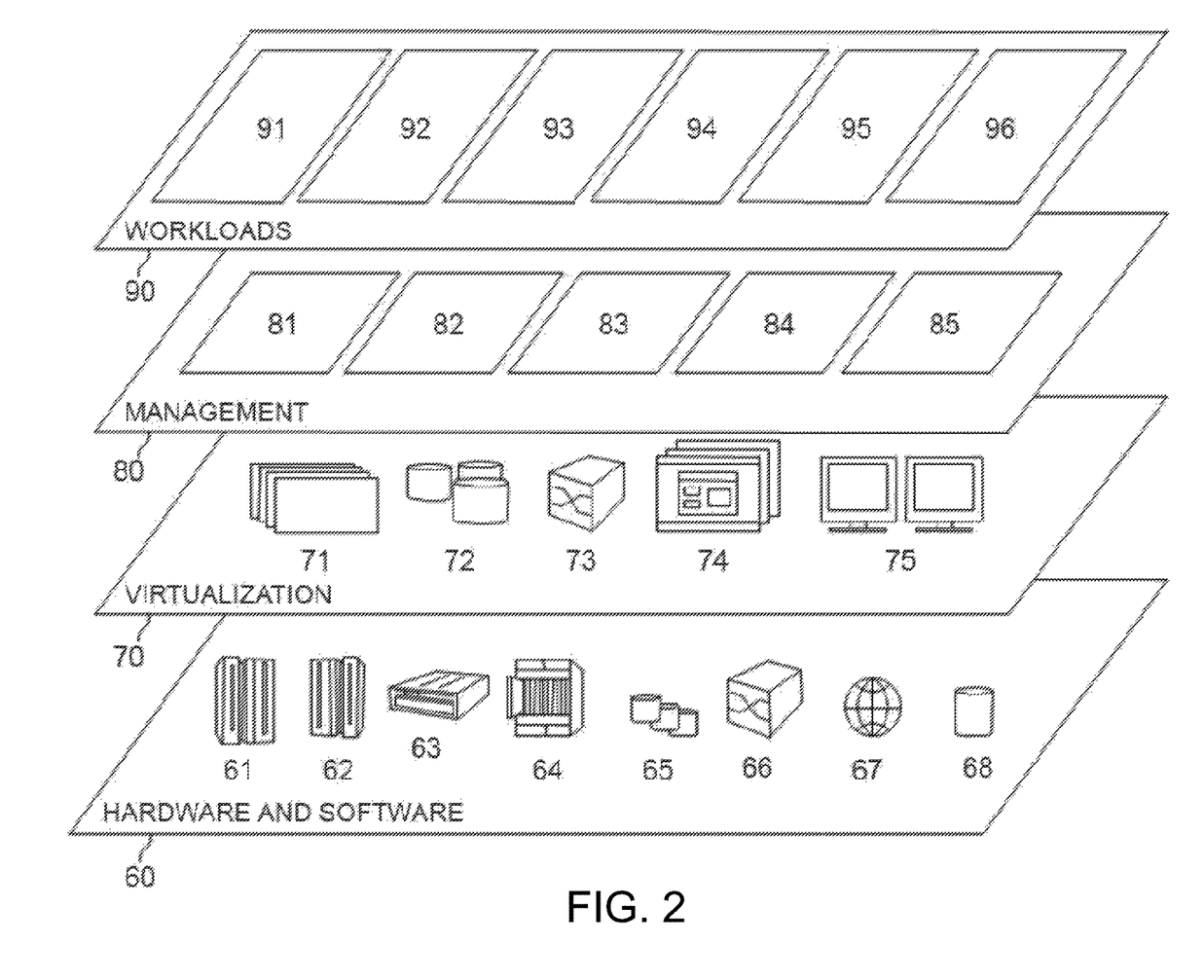
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing for an automated participation evaluator according to embodiments of the present invention 96.

Figure 3:
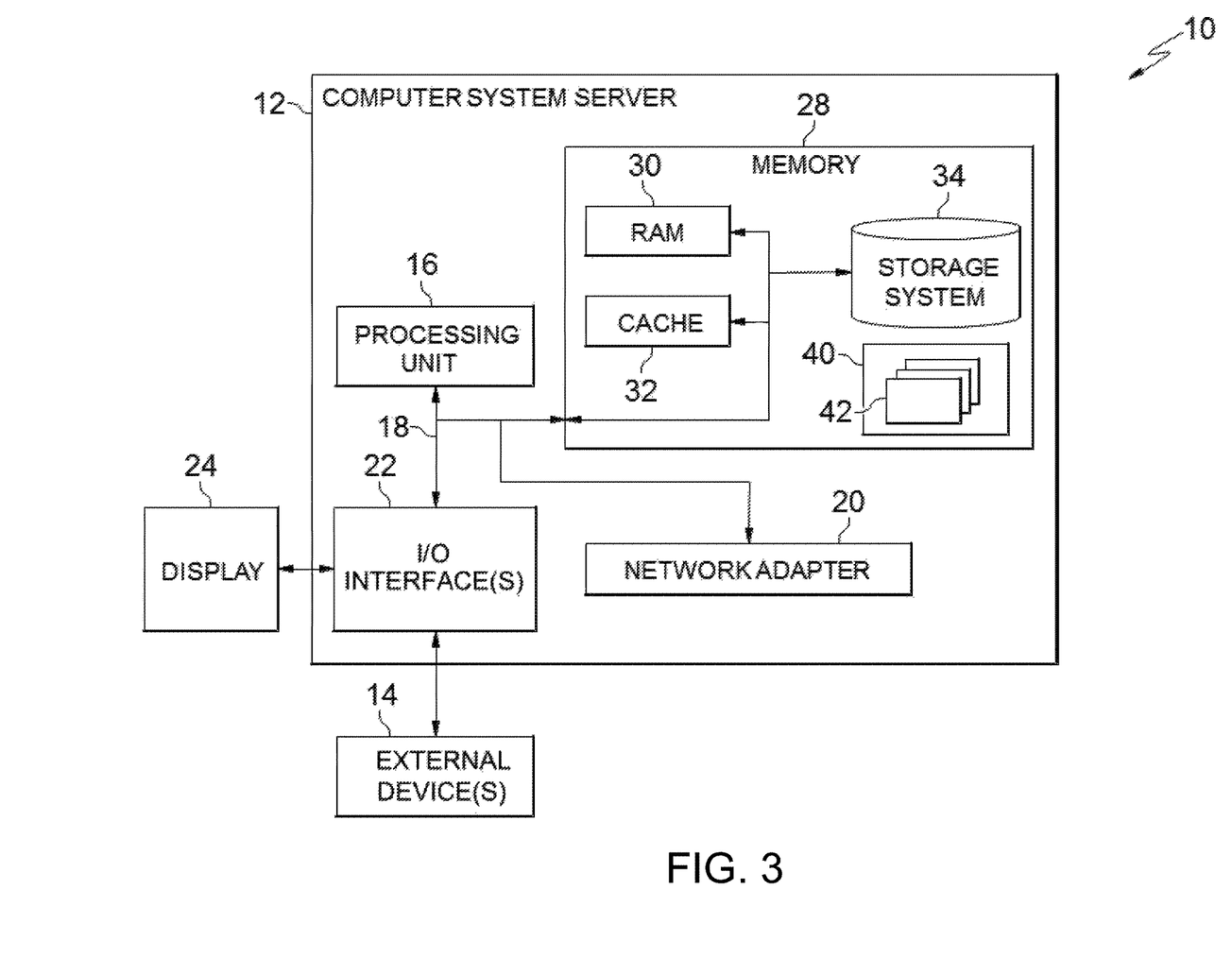
FIG. 3 depicts a computerized aspect according to an embodiment of the present invention.

FIG. 3 is a schematic of an example of a programmable device implementation 10 according to an aspect of the present invention, which may function as a cloud computing node within the cloud computing environment of FIG. 2. Programmable device implementation 10 is only one example of a suitable implementation and is not intended to suggest any limitation as to the scope of use or functionality of embodiments of the invention described herein. Regardless, programmable device implementation 10 is capable of being implemented and/or performing any of the functionality set forth hereinabove.

A computer system/server 12 is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

The computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 4:
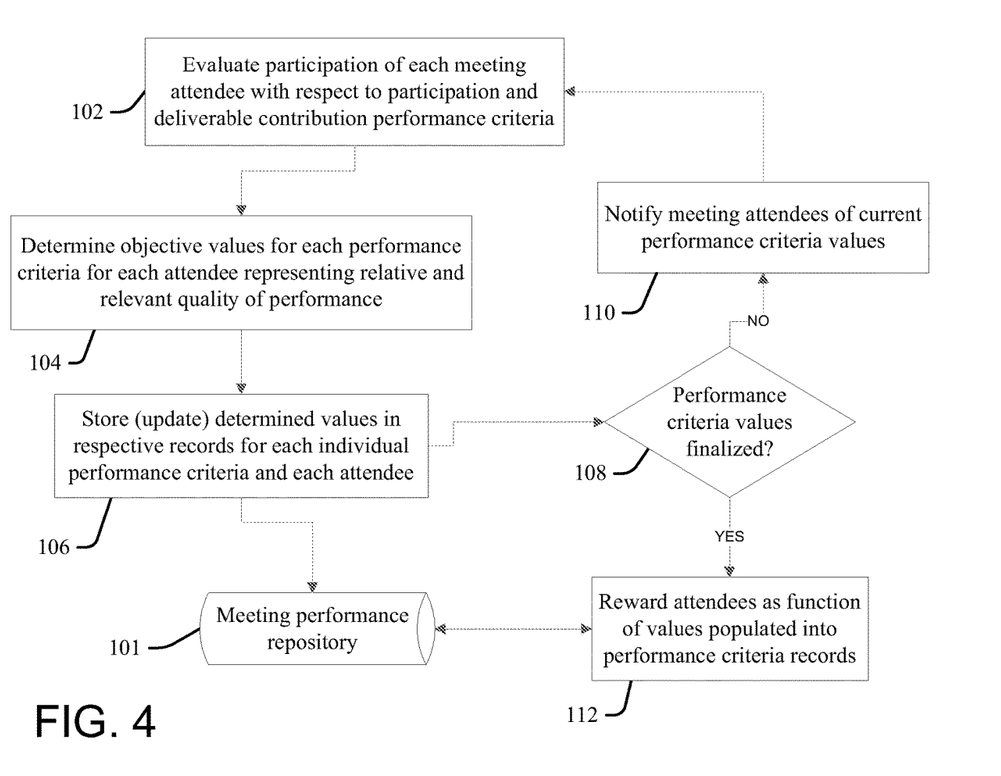
FIG. 4 is a flow chart illustration of an embodiment of the present invention.

FIG. 4 illustrates an automated participation evaluator according to embodiments of the present invention. A processor (for example, a central processing unit (CPU)) executes code (such as code installed on a storage device in communication with the processor) and is thereby configured according to the present invention (a "configured processor") to, at 102, evaluate (monitor) the participation of each of a plurality of attendees of a meeting with respect to each of a plurality of different predefined and measurable (or objectively definable) performance criteria (attributes, variables, etc.) that include participation and deliverable contribution criteria.

At 104, in response to the evaluation at 102, the configured processor determines objective values (points, percentages, confidence values, etc.) for each of the individual performance criteria for each of the attendees that reflect or represent the relevant quality of their performance during or after the meeting relative to the respective performance criteria, and at 106 stores (populates) the determined values to respective records (database fields, object values, etc.) for each of the individual performance criteria for each of the attendees within a meeting performance database or repository 101. For example, at 104 and 106 the configured processor assigns/populates positive or higher values in proportion to an amount or relative strength of good or positive performance with respect to a given criteria, relative to an applicable standard or the performances of other attendees, or negative or lower values in proportion to unacceptable or negative relative performance with respect to a given criteria. Illustrative but not exhaustive or limiting examples of performance participation criteria that are assessed during the meeting at 104 include, attentiveness, participation, attendance rate, timeliness, and multitasking behavior criteria.

At 108 the configured processor determines whether the criteria values are finalized: whether the meeting is over for meeting performance metrics, and whether any post-meeting assessment or contribution period has ended for post-meeting performance metric assessments, as discussed further below. If not, at 110 the configured processor notifies the meeting attendees of the values currently assigned to their respective performance criteria and returns to the process at 102, defining a positive feedback process while performance evaluation at 102 and score assessment at 104 is ongoing (during the meeting, or in post-meeting assessment phases), and accordingly while the attendee is performing actions that are assessed to generate the populated values at 102 and 104.

By giving direct feedback to the attendees via the process at 110 the embodiments enable each attendee to revise their performance to raise their criteria values as published to the attendees, which may thereby directly improve the quality of the meeting with respect to that attendee and/or other attendees when the criteria are defined to reflect meeting or participation quality. For example, upon notice at 110 to a first attendee that said first attendee currently has a low multitasking criteria value, which is indicative of a determination at 102 and 104 that the attendee is spending (too much) time engaging a personal smart phone or other activity rather than directing attention to a presenter or display screen during presentation of key topics, the first attendee may alter behavior resulting in the poor multitasking criteria value (end active engagement of a smart phone, physically re-orient to convey in image data that the attention of the first attendee is focused on the meeting display screen, stop a side conversation with another attendee, or otherwise exhibit a more-focused attention participation. Each iterative update to the first attendee at 110 of the multitasking criteria value give the attendee direct feedback as to how their most recent behavior (since the last update) is being assessed as to each of the criteria values.

When the configured processor determines at 108 that the criteria values are finalized (that the meeting and any post-meeting assessment period has lapsed or has otherwise ended), at 112 the configured processor rewards attendees as a function of the values populated into the performance criteria records for the attendees. For example, the configured processor may allot a specified amount of awards (food voucher amounts, cash, extra leave time or other incentive rewards) to each attendee in amounts selected in proportion to relative differences in the assigned values of their respective performance criteria values, or to groups of the attendees (for example, team subsets, or all attendees considered together). Thus, the attendees are incentivized by the potential of receiving increased rewards at 112 to improve their performances assessed at 104, as well as those of their "teammates" or others of the attendees for which their scores are considered together in determining award amounts.

The participation criteria may include attentiveness, participation amount, attendance, timeliness, and multitasking behavior. Attentiveness criteria may be defined and assessed at 102, and values assigned at 104, as a function of elapsed time, or proportion of meeting time, that an attendee is determined to be looking at a web meeting or presenter screen, and/or not inattentive (asleep, talking on a mobile phone or to another attendee, etc.). Attentiveness may be determined by image analysis from video camera data recording the actions of the attendees during the meeting. Some examples acquire a screen shot of a presenter's screen and use eye-tracking mechanisms to simultaneously identify what part of the screen an attendee is focused upon (for example, as defined by gaze angle and determining possible or likely display screen subset area that the attendee is focused upon), and comparing the area of focus of the attendee image to areas of content within the present image, wherein higher points are awarded in response to correlating the gaze and/or focus of the attendee with a subset portion of the screen that is the focus of a current discussion by the presenter.

Participation criteria may include a participation amount criteria that is defined, and values assigned, as a function of elapsed time, or proportion of meeting time, that the attendee is actively engaged in the meeting, such as by asking questions or submitting comments. Other metrics considered by the configured processor in setting a participation value include amount of comment or survey response text content input, or number of messaging replies sent by attendee, including in response to (associated by voice or text content, or by proximity in time to) questions or other solicitations for comments or answers by the presenter.

Attendance criteria may be defined, and values assigned, as a function of total meetings attended, rate of meeting attendance, or elapsed time or proportion of meeting time, that an attendee is present within a designated meeting attendance space during the meeting and/or previous meetings. Designated meeting spaces include a meeting room, or a personal computer that the attendee has logged-on to and used to view or listening to web conference material via an active window on the computer.

Timeliness criteria includes arriving on time for a scheduled meeting, and values may be assigned as a function of verifying that the attendee is within the designated meeting attendance space and paying attention to the presentation materials at the commencement of the meeting, including at upon the conclusion of any breaks. For example, values assigned may be reduced by (or in proportion to) the time amounts that the attendee is late, or to reflect frequency values or total times that the attendee has been historically late meetings, wherein the value is updated with each new meeting.

Multitasking behavior criteria may be defined, and values assigned, as a function of determining an extent (total time, percentage of time, number of discrete times, etc.) to which the attendee performs other activities during the meeting: for example, time spent answering or sending phone calls, text messages, emails, or operating a word processing or spreadsheet or other program that is not directly related to activities during the meeting (such as not answering a question posed by the presenter) results in negative or lower multitasking scores or values.

Deliverable contribution criteria values represent qualitative assessments of the value of contributions to an agenda objectives or overall value of the meeting, or to other attendees, by the active participation of a given attendee during the meeting or during a post-meeting assessment period. For example, the configured processor determines the values populated to the object fields associated to the deliverable contribution criteria in proportion to amounts that contributions by the attendees to the meeting meet an agenda objective.

Deliverable contribution criteria valuation dependencies may also be defined and applied that link or associate deliverable contribution criteria values to participation performance criteria. For example, the configured processor may award higher positive values to the performance of a meeting attendee based on determining a relatively higher amount of conversational participation content relative to other attendees of the meeting may be dependent on determining a corresponding high or threshold deliverable contribution criteria value of the conversational participation content based on relevance to key topics of the meeting (and not, for example, a discussion of a lunch menu or weather condition or other topic unrelated to the meeting key topics).

Embodiments may use speech recognition and voice print analysis to identify an attendee providing verbal answers to a question from a presenter, leader or other attendee or participant, and assess a qualitative value of the provided by said answer in terms of accuracy in response, awarding a high deliverable contribution criteria value where the presenter or other questioner verbally states that the answer is correct or otherwise indicate that the answer is satisfactory (stating "good answer" or "good point"), or where Natural Language Processing (NLP) indicates that the content of the answer is strongly relevant (of a threshold relevancy) to the pending question or topic under discussion in the meeting.

The valuation of a deliverable contribution criteria value may also increase in proportion to an amount of related discussion determined to occur within the meeting in response to the attendee answer or other contribution: for example, setting a score or value assigned as a function of length of time of engagement in a conversation with a meeting leader, panelist or presenter, or of a continual discussion by others in the meeting instigated by or related to the content of the attendee's contribution, which may include assigning values responsive to determining that content is germane to a key topic of the meeting.

Deliverable contribution criteria evaluated at 102 and 104 may include review contribution criteria that the configured processor values in response to qualitative assessments of the value of attendee contribution to post-meeting review of meeting objectives, key topics, or other attributes. For example, embodiments award or increase review contribution criteria values in proportion to amounts of attendee review contributions, such as total time allocated to review as indicated by on-line activity related to review of the meeting content, or by claims for time by the attendee; or amounts of text content generated by attendee in review of the meeting content, or in response to follow-up questions or tasks related to the meeting, etc. Valuation of the review contribution criteria may also be qualitative (in proportion or responsive to a level of accuracy or relevance of review contribution, or an amount of related review contribution generated in response to attendee review contribution, etc.)

Deliverable contribution criteria evaluated at 102 and 104 may also include skills-applied criteria, wherein techniques or methods applied by an attendee in generating or developing meeting content or completing post-review tasks are evaluated with respect to positive outcomes (deliverables). For example, an attendee generating a spreadsheet that processes raw data to generate populated data values that satisfy a request presented during the meeting for follow-up data and analysis is awarded a skills-applied criteria value by the configured processor at 104 in an amount that reflects a level of effort or expertise required to generate the resultant end product.

Deliverable contribution criteria evaluated at 102 and 104 may also include skills-acquired criteria, wherein the configured processor awards an attendee a criteria value in proportion to determining an amount of learning-hours or other metric that is (likely) required by the attendee to expend in order to generate meeting or review deliverables. For example, for a meeting topic is "enforcement costs for proposed Regulation A," and an attendee presents a report of costs for implementing an analogous regulation in a different technical field during a post-meeting response or review period, the configured processor may set the value of the skills-acquired criteria for that attendee at 104 in proportion to an estimate of person-hours required to acquire the analogous information and/or generate the report.

Figure 5:
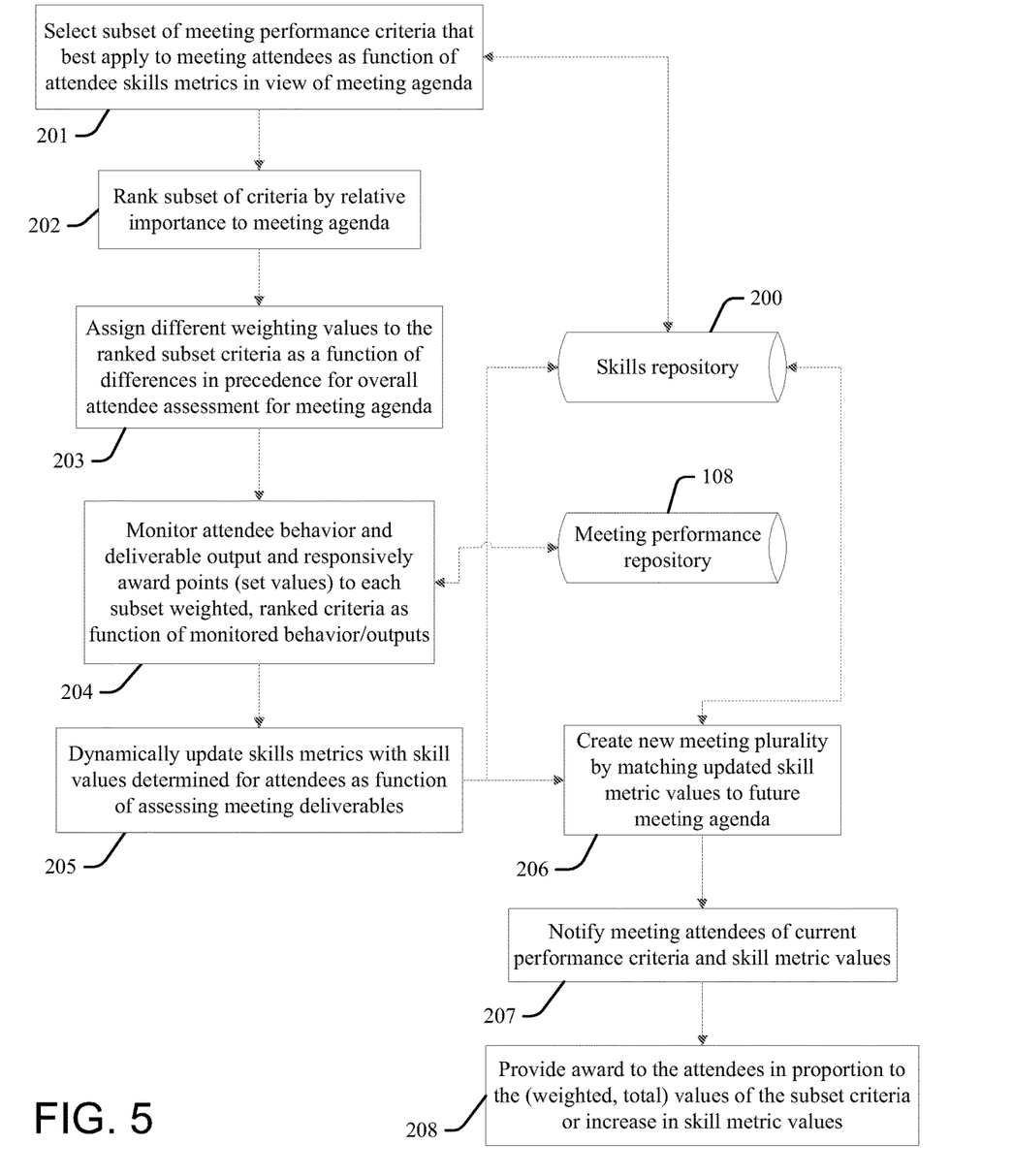
FIG. 5 is a flow chart illustration of another embodiment of the present invention.

FIG. 5 illustrates an alternative embodiment of the present invention wherein a processor (for example, a central processing unit (CPU)) executes code (such as code installed on a storage device in communication with the processor) and is thereby configured according to the present invention (a "configured processor") to, at 201, provide "group leader" functions that includes defining a plurality of different predefined and measurable (or objectively definable) meeting performance criteria (attributes, variables, etc.) for application to a plurality of meeting attendees (participants, etc.) of a meeting as a function of skills (strengths, certifications, accomplished tasks, etc.) metric values that are stored in a skills repository 200 with respect to one or more of the their respective meeting attendees.

In some embodiments, at 201 the configured processor determines (selects) a subset of a universe of possible meeting performance criteria that (best, most likely) apply to the meeting attendees in assessing their performance relevant to the meeting as a function of their skills metrics (job titles, certifications, etc.) in view of a meeting agenda. For example, in response to determining that a meeting agenda comprehends includes Linux® programming subject matter, at 201 the configured processor selects a subset of meeting performance criteria for use in assessing attended performance to include LINUX programming knowledge and application deliverable contribution criteria. (LINUX is a registered trademark of Linus Torvalds in the U.S. and other countries.)

At 202 the configured processor orders or ranks the selected subset of criteria (variables) by importance relative to the meeting agenda. For example, for a meeting having an agenda related to solving a specific business problem through programmable resources, the configured processor ranks programming performance deliverable contribution criteria higher than other performance criteria (attendance, multitasking, attentiveness, etc.) within the selected subset of criteria. In contrast, in response to determining that a different meeting has a continuing education agenda, the configured processor ranks the attendance, multitasking and attentiveness performance criteria higher in importance for attended performance relative to their programming performance deliverable contribution criteria (as more relatively more germane to defining a good meeting performance).

In some embodiments the ranking at 202 includes assigning larger possible point values to the higher-ranked criteria, so that the points values of the higher-ranked criteria have a higher proportionate impact on overall attendee performance score metrics, relative to the other, lower-ranked criteria, in judging overall attendee performance.

At 203 the configured processor assigns different weighting or percentage values to the ranked subset criteria as a function of precedence in importance in overall attendee assessment for the meeting agenda.

In some embodiments each of the assigned values are percentage values, wherein a total of the assigned values equals 100%. For example, a-performing criteria for a given attendee is assigned a highest percentage value, and the lowest-performing criteria is assigned lowest percentage value, with others of the criteria assigned percentage values in between the highest and lowest values, in proportion to respective, relative qualities of performance. In one example the configured processor assigns the different weighting or percentage values to total one-hundred (100) in cumulative value. Thus, in one embodiment the configured processor assigns the weighting values of a subset of four (4) criteria according to the following equation:

TC (Total Contribution) value 100%=MP (Meeting Participation) value $A$ %+DC (Deliverable Contribution) value $B$ %+RC (Review Contribution) value $C$ %+Skills applied value $D$ %;

wherein the configured processor selects each of the specific, different A, B, C and D percentage values at 203 as a function of their relative precedence in importance in overall attendee assessment, assigning higher % values to criteria related to areas that have a higher value to the meeting agenda subject matter. For example, the configured processor assigns a higher weight percentage at 203 to a deliverable, code-writing value for a software project meeting agenda, and in contrast, higher participation criteria weightings for an architectural discussion meeting agenda.

At 204 the configured processor monitors attendee behavior and deliverable outputs during the meeting (and/or a post-meeting period) and responsively awards points (sets values) for each of the subset criteria within the meeting performance repository 101 as a function of comparing the monitored behavior or outputs to the weighted and ranked subset performance criteria.

At 205 the configured processor dynamically updates and the skills metric repository 200 with skill values determined for the attendees as function of assessing meeting deliverables, during the meeting or post-meeting assessment periods.

In some aspects configured processor uses the updated skills repository metric 200 at 206 to recommend or create new project teams or other meeting pluralities by matching the updated skill metric values to future meeting agendas. Thus, new teams or meeting invitations may be determined at 206 in response to determining at 205 that a meeting attendee has developed or acquired new or improved skills. For example, in response to the configured processor awarding a high LINUX programming deliverable criteria value to the output of a first meeting attendee at 205, wherein the first attendee had no low or no previous LINUX skill values indicated within the skill repository 200, at 206 the configured processor adds the first attendee to a LINUX programming team for a scheduled future meeting as a function of the updated LINUX skill value within the skill repository 200.

At 207 the configured processor provides automatic feedback to each attendee of their current subset criteria and skills scores and values. Where the feedback is provided during the assessment period or phase of 204, 205 and/or 206, the attendee may be motivated to improve assessed performances in order to see the scores increase via the feedback process at 207, wherein the attendee is notified of areas (scores) that need improvement or, where they need to strengthen their skills, to dynamically improve their meeting assignments and selections, etc.

At 208 the configured processor provides an award (monetary, increased employee rating values, etc.) to the attendees in proportion to the values of the subset criteria or skill metric values, or total (weighted) points thereof, including as discussed above.

While the use of virtual events may greatly expand participation opportunities relative to physical meetings with respect to numbers of attendees and amount and ability of attendees to contribute to a meeting, increasing the scale of participation necessarily increases the scale of and cost of monitoring resources used to verify attendance and participation. While attendees may be logged-on, they may also fail to engage a meeting presentation in a satisfactory manner, requiring service providers to deploy resources to verify satisfactory attendance or participation. In the prior art it is common that with, respect to a group of people attending a virtual meeting, not all of the people are fully or equally participating, or in a similar fashion. Some might contribute with clearer ideas, some others might be very quiet, and some others might not contribute deliverables at all, or fail to fully attend.

Embodiments of the present invention provide advantages over the prior art in managing attendee meeting performances, via novel feedback and incentive structures. By generating rewards for attendees as a function of assessing meeting performance, embodiments of the present invention encourage each of the attendees to contribute value towards the meeting agenda that forms the basis for evaluation metrics.

Rewards generated by embodiments (including at 112, FIG. 4 or at 208 of FIG. 5) may also be based on criteria of skills metrics determined on a team, subset or totality basis. Where the reward for any one attendee is based on aggregating or assessing their scores or metrics with those of teammates, etc., the attendee is incentivized to help their fellow attendee perform better or otherwise be award higher values: they are incentivized to reach to them to ensure that their neighbor or fellow meeting attendee is paying attention, contributing, attending timely, etc., which may improve the quality of the meeting for all attendees, as well as cause the behavior of an aggregate of meeting attendees to better serve an agenda of the meeting. Thus, the score of assembly-based outcome of the meeting may be related to a monetary award or an individual reward that is based on the outcomes of a whole team. While all individuals may be rewarded with a same amount of money or recognition, some embodiments may reward attendees individually, in proportion to their criteria and skill points determined from their individual participation in a meeting, or a set of meetings considered together.

The terminology used herein is for describing aspects only and is not intended to be limiting of the invention. As used herein, the singular forms "a", "an" and "the" are intended to include the plural forms as well, unless the context clearly indicates otherwise. It will be further understood that the terms "include" and "including" when used in this specification specify the presence of stated features, integers, steps, operations, elements, and/or components, but do not preclude the presence or addition of one or more other features, integers, steps, operations, elements, components, and/or groups thereof. Certain examples and elements described in the present specification, including in the claims, and as illustrated in the figures, may be distinguished, or otherwise identified from others by unique adjectives (e.g. a "first" element distinguished from another "second" or "third" of a plurality of elements, a "primary" distinguished from a "secondary" one or "another" item, etc.) Such identifying adjectives are generally used to reduce confusion or uncertainty, and are not to be construed to limit the claims to any specific illustrated element or embodiment, or to imply any precedence, ordering or ranking of any claim elements, limitations, or process steps.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising executing on a computer processor:
   determining, via image analysis of video camera data recording, actions of each of a plurality of attendees of a meeting;
   determining, via an eye-tracking mechanism, a first portion of a meeting display screen that at least one of the attendees is focused upon as a function of gaze angle;
   determining participation values for each of the attendees as a function of determining whether that the actions of the attendees comprise at least one of engaging a personal phone during the meeting, physically orientating focus upon the first portion of the meeting display screen as a function of the gaze angle, and engaging in a side conversation with another attendee;
   populating a plurality of object fields that are each associated to ones of the attendees with the participation values determined for the respective ones of the attendees;
   in response to determining that a period of time for evaluating the participation of the attendees of the meeting with respect to the determined participation values has not elapsed, notifying the attendees of the participation values populated to the object fields;
   in response to the notifying of the attendees of the participation values populated to the object fields, updating the participation values populated to the object fields via reevaluating the actions of the attendees via image analysis of the video camera data recording and determining via the eye-tracking mechanism portions of the meeting display screen that at least one of the attendees is focused upon as a function of gaze angle; and
   in response to determining that periods of time for evaluating the participation of the attendees of the meeting with respect to the determined participation values have elapsed, populating another plurality of object fields that are each associated to ones of the attendees with reward values selected as a function of the participation values populated to the object fields.

2. The method of claim 1, further comprising:
   comparing the first portion of the meeting display screen to an area of content that is presented upon the meeting display screen and that is a focus of a current discussion by a presenter; and
   increasing the participation value for the one attendee in response to correlating the first portion to the area of content.

3. The method of claim 1, further comprising:
   integrating computer-readable program code into a computer system comprising a processor, a computer readable memory in circuit communication with the processor, and a computer-readable storage medium in circuit communication with the processor; and
   wherein the processor executes program code instructions stored on the computer-readable storage medium via the computer readable memory and thereby performs the determining the participation values for each of the attendees, the populating the plurality of object fields with the participation values, the notifying the attendees of the participation values populated to the object fields, the updating the participation values populated to the object fields, and the rewarding the attendees with the reward values.

4. The method of claim 3, wherein the computer-readable program code is provided as a service in a cloud environment.

5. The method of claim 1, further comprising:
   determining the participation values for each of the attendees as a function of an amount of comment text content input from the attendees in response to a solicitation for comment by the presenter, and a number of messaging replies sent by the attendees in response to the solicitation for comment by the presenter.

6. The method of claim 5, further comprising:
   determining the participation values for each of the attendees as a function of proportions of meeting time that the attendees are present within a designated meeting attendance space during the meeting.

7. The method of claim 6, and further comprising:
   determining the participation values for each of the attendees in proportion to amounts that contributions by the attendees during the periods of time for the evaluating the participation of the attendees meet an agenda objective.

8. The method of claim 7, further comprising:
   determining an amount that a first contribution by a first of the attendees during the periods of time for the evaluating the participation of the attendees meets the agenda objective in proportion to a strength of association of the first contribution to a positive assessment comment by another of the attendees or by a meeting presenter.

9. The method of claim 8, further comprising:
identifying one of the first attendees, the another of the attendees and the meeting presenter via a process selected from the group consisting of speech recognition and voice print analysis.

10. The method of claim 9, further comprising:
using natural language processing to determine that text content of the first contribution meets the agenda objective.

11. A system, comprising:
a processor;
a computer readable memory in circuit communication with the processor; and
a computer readable storage medium in circuit communication with the processor;
wherein the processor executes program instructions stored on the computer-readable storage medium via the computer readable memory and thereby:
determines, via image analysis of video camera data recording, actions of each of a plurality of attendees of a meeting;
determines, via an eye-tracking mechanism, a first portion of a meeting display screen that at least one of the attendees is focused upon as a function of gaze angle;
determines participation values for each of the attendees as a function of determining whether that the actions of the attendees comprise at least one of engaging a personal phone during the meeting, physically orientating focus upon the first portion of the meeting display screen as a function of the gaze angle, and engaging in a side conversation with another attendee;
populates a plurality of object fields that are each associated to ones of the attendees with the participation values determined for the respective ones of the attendees;
in response to determining that a period of time for the evaluating the participation of the attendees of the meeting with respect to the determined participation values has not elapsed, notifies the attendees of the participation values populated to the object fields;
in response to the notifying of the attendees of the participation values populated to the object fields, updates the participation values populated to the object fields via reevaluating the actions of the attendees via image analysis of the video camera data recording and determining via the eye-tracking mechanism portions of the meeting display screen that at least one of the attendees is focused upon as a function of gaze angle; and
in response to determining that periods of time for evaluating the participation of the attendees of the meeting with respect to the determined participation values have elapsed, populates another plurality of object fields that are each associated to ones of the attendees with reward values selected as a function of the participation values populated to the object fields.

12. The system of claim 11, wherein the processor executes the program instructions stored on the computer-readable storage medium via the computer readable memory and thereby:
compares the first portion of the meeting display screen to an area of content that is presented upon the meeting display screen and that is a focus of a current discussion by a presenter; and
increases the participation value for the one attendee in response to correlating the first portion to the area of content.

13. The system of claim 12, wherein the processor executes the program instructions stored on the computer-readable storage medium via the computer readable memory and thereby:
determines the participation values for each of the attendees as a function of an amount of comment text content input from the attendees in response to a solicitation for comment by the presenter, and a number of messaging replies sent by the attendees in response to the solicitation for comment by the presenter.

14. The system of claim 13, wherein the processor executes the program instructions stored on the computer-readable storage medium via the computer readable memory and thereby:
determines the participation values for each of the attendees as a function of proportions of meeting time that the attendees are present within a designated meeting attendance space during the meeting.

15. The system of claim 14, wherein the processor executes the program instructions stored on the computer-readable storage medium via the computer readable memory and thereby:
identifies one of the first attendee, the another of the attendees and the meeting presenter via a process selected from the group consisting of speech recognition and voice print analysis; and
uses natural language processing to determine that text content of the first contribution meets the agenda objective.

16. A computer program product for an automated participation evaluator, the computer program product comprising:
a computer readable storage medium having computer readable program code embodied therewith, wherein the computer readable storage medium is not a transitory signal per se, the computer readable program code comprising instructions for execution by a processor that cause the processor to:
determine, via image analysis of video camera data recording, actions of each of a plurality of attendees of a meeting;
determine, via an eye-tracking mechanism, a first portion of a meeting display screen that at least one of the attendees is focused upon as a function of gaze angle;
determine participation values for each of the attendees as a function of determining whether that the actions of the attendees comprise at least one of engaging a personal phone during the meeting, physically orientating focus upon the first portion of the meeting display screen as a function of the gaze angle, and engaging in a side conversation with another attendee;
populate a plurality of object fields that are each associated to ones of the attendees with the participation values determined for the respective ones of the attendees;
in response to determining that a period of time for the evaluating the participation of the attendees of the meeting with respect to the determined participation values has not elapsed, notify the attendees of the participation values populated to the object fields;

in response to notifying of the attendees of the participation values populated to the object fields, update the participation values populated to the object fields via reevaluating the actions of the attendees via image analysis of the video camera data recording and determining via the eye-tracking mechanism portions of the meeting display screen that at least one of the attendees is focused upon as a function of gaze angle; and in response to determining that periods of time for evaluating the participation of the attendees of the meeting with respect to the determined participation values have elapsed, populate another plurality of object fields that are each associated to ones of the attendees with reward values selected as a function of the participation values populated to the object fields.

17. The computer program product of claim 16, wherein the computer readable program code instructions for execution by the processor further cause the processor to:

compare the first portion of the meeting display screen to an area of content that is presented upon the meeting display screen and that is a focus of a current discussion by a presenter; and increase the participation value for the one attendee in response to correlating the first portion to the area of content.

18. The computer program product of claim 17, wherein the computer readable program code instructions for execution by the processor further cause the processor to:

determine the participation values for each of the attendees as a function of an amount of comment text content input from the attendees in response to a solicitation for comment by the presenter, and a number of messaging replies sent by the attendees in response to the solicitation for comment by the presenter.

19. The computer program product of claim 18, wherein the computer readable program code instructions for execution by the processor further cause the processor to:

determine an amount that a first contribution by a first of the attendees during the periods of time for the evaluating the participation of the attendees meets an agenda objective in proportion to a strength of association of the first contribution to a positive assessment comment by another of the attendees or by a meeting presenter.

20. The computer program product of claim 19, wherein the computer readable program code instructions for execution by the processor further cause the processor to:

identify one of the first attendee, the another of the attendees and the meeting presenter via a process selected from the group consisting of speech recognition and voice print analysis; and use natural language processing to determine that text content of the first contribution meets the agenda objective.

* * * * *